(12) United States Patent
Margolis

(10) Patent No.: US 6,482,457 B1
(45) Date of Patent: Nov. 19, 2002

(54) METHOD FOR PRODUCING A RECONSTITUTABLE DEHYDRATED FOOD PRODUCT

(76) Inventor: Geoffrey Margolis, 12229 Falkirk La., Los Angeles, CA (US) 90049

( * ) Notice: Subject to any disclaimer, the term of this patent is extended or adjusted under 35 U.S.C. 154(b) by 0 days.

(21) Appl. No.: 09/640,297

(22) Filed: Aug. 16, 2000

(51) Int. Cl.[7] ............... A23L 1/20; A23L 1/212; A23P 1/00; A21D 8/00
(52) U.S. Cl. ............ 426/459; 426/634; 426/516; 426/518; 426/502; 426/503; 426/506; 426/464; 426/507; 426/508
(58) Field of Search ................... 426/634, 518, 426/516, 502, 503, 459, 464, 506, 507, 508

(56) References Cited

U.S. PATENT DOCUMENTS

| 113,063 | A | 3/1871 | Kirkwood |
|---|---|---|---|
| 202,975 | A | 4/1878 | Andres |
| 1,011,730 | A | 12/1911 | Braunbeck |
| 1,088,741 | A | 3/1914 | Stephens |
| 1,509,076 | A | 9/1924 | Berczeller |
| 1,609,705 | A | 12/1926 | Forrest |
| 1,813,268 | A | 7/1931 | Bachler |
| 1,859,279 | A | 5/1932 | Chamberlain |
| 2,026,676 | A | 1/1936 | Gill |
| 2,279,280 | A | 4/1942 | Musher |

(List continued on next page.)

FOREIGN PATENT DOCUMENTS

| GB | 562648 | 7/1944 |
|---|---|---|
| GB | 648373 | 1/1951 |
| GB | 783974 | 10/1957 |
| GB | 938381 | 10/1963 |
| GB | 1017519 | 1/1966 |
| GB | 2118421 | 11/1983 |
| GB | 2163938 | 3/1986 |

*Primary Examiner*—Anthony J. Weier
(74) *Attorney, Agent, or Firm*—Pillsbury Winthrop LLP

(57) ABSTRACT

A method for producing a reconstitutable dehydrated food product and an apparatus for producing such a product are described. The method calls for the use of a stationary vessel that is used as both a hydration device and a pressure cooker. A rotating member within the vessel ensures that the vessel contents are continuously mixed, and that fluids within the vessel are continuously spread through the contents. The apparatus also has a channel, wherein the food product is chopped and sized as desired, before going through a forming conduit that spreads the product into a generally flat sheet of texturized composition. The method and apparatus produce a dehydrated food product of a desired texture, with improved water absorption qualities and enhanced digestibility.

23 Claims, 3 Drawing Sheets

U.S. PATENT DOCUMENTS

| | | |
|---|---|---|
| 2,343,149 A | 2/1944 | Krause, Jr. |
| 2,475,554 A | 7/1949 | Müller |
| 2,489,267 A | 11/1949 | Chapin et al. |
| 2,657,999 A | 11/1953 | Rauch |
| 3,067,042 A | 12/1962 | Pader |
| 3,253,930 A | 5/1966 | Gould et al. |
| 3,275,458 A | 9/1966 | Willard, Jr. |
| 3,290,159 A | 12/1966 | Dorsey et al. |
| 3,291,615 A | 12/1966 | Thompson et al. |
| 3,317,324 A | 5/1967 | Austin et al. |
| 3,489,571 A | 1/1970 | Hannum |
| 3,594,185 A | 7/1971 | Hawley et al. |
| 3,594,186 A | 7/1971 | Hawley et al. |
| 3,598,610 A | 8/1971 | Hawley et al. |
| 3,787,595 A | 1/1974 | Folzenlogen et al. |
| 4,022,919 A | 5/1977 | Comer |
| 4,153,738 A | 5/1979 | Ronai et al. |
| 4,233,322 A | 11/1980 | Fritze |
| 4,251,558 A | 2/1981 | Kobayashi et al. |
| 4,273,796 A | 6/1981 | Maxcy et al. |
| 4,359,480 A | 11/1982 | Kock |
| 4,400,402 A | 8/1983 | Vibbert et al. |
| 4,407,840 A | 10/1983 | Lathrop et al. |
| 4,676,990 A | 6/1987 | Huffman et al. |
| 4,735,816 A | 4/1988 | Sterner et al. |
| 4,818,558 A | 4/1989 | Hartman et al. |
| 4,853,248 A | 8/1989 | Wiirsch et al. |
| 4,871,567 A | 10/1989 | Sterner et al. |
| 5,124,170 A | 6/1992 | Sterner et al. |
| 5,296,253 A | 3/1994 | Lusas et al. |
| 5,725,902 A | 3/1998 | Lesueur-Brymer et al. |
| 5,744,188 A | 4/1998 | Kolla et al. |
| 5,863,592 A | 1/1999 | Sterner et al. |

METHOD FOR PRODUCING A RECONSTITUTABLE DEHYDRATED FOOD PRODUCT

BACKGROUND OF THE INVENTION

1. Field of the Invention

This invention is in the field of food products and, more particularly, directed to a method for producing a dehydrated food product that is easily and quickly reconstitutable, and that, upon reconstitution, has a textured composition closely resembling the consistency and texture of conventionally-prepared refried beans.

2. Art Background

The prevalence of fast-food style establishments in recent years has been accompanied by an increased demand for reconstitutable food products, such as, for example, dehydrated refried beans. From an economic point of view, such products have several advantages. For example, each establishment can buy and store the product in bulk quantities without the risk of spoilage. Also, since the product is normally reconstituted in a matter of minutes by adding only water, there are savings in time, energy, and labor associated with the use of these products. Finally, since there is no need to continually prepare the food product in the conventional manner (i.e., to make the food fresh, and on a daily basis), there is also no need for each establishment to keep extra equipment (e.g., cookware, etc.) on the premises. As such, methods have been devised to produce reconstitutable food products that, ideally, could be prepared very quickly, and would have the taste, texture, and appearance of their conventionally prepared counterparts.

Current methods and apparatus for producing such food products and, more specifically, refried bean products, required that one consider various factors. For example, to satisfy the requirement that the raw beans be mixed as they are hydrated and, also, as they are cooked, a number of the methods presently known employ rotating vessels. Vessels that rotate are used so that the beans can be contacted with a small amount of water that is diminishing as the water is absorbed by the beans. Controlled amounts of water are used during the cooking process in hopes that at the end, little or no water remains—only the cooked, hydrated beans. This is difficult to achieve, and the art has searched for various methods, as excess water can result in yield loss (some of the beans will dissolve into the water) and/or a pasty product that is difficult to further process and dry. Merely placing the beans in water has other shortcomings. For example, such method can result in some beans becoming too soft, while others do not become properly hydrated. Further, prior art vessels are generally quite bulky, which not only translates into added and more-frequent maintenance requirements, but also makes it more difficult to achieve economies of scale. Further still, generally, in many prior art vessels only a small amount of beans can be treated. In other words, to achieve the benefit of a small water-to-bean ratio, rotating vessels of particular configurations and having limited capacities were used. Even then, it is difficult to control the water absorption into the beans.

Yet other shortcomings relate to the starting materials that are used. In a typical prior art process for preparing refried beans, dry, raw beans are placed into the vessel, and a small quantity of water is added. Unless the vessel rotated, the beans on the top of the pile could absorb a different amount of water as compared to the beans at a position lower down. Further, as the water level in the vessel decreases, yet further non-uniform water absorption throughout the beans could result. It is known that raw beans typically have an initial moisture content in the range 6%–14%. However, current methods have difficulty using a batch of raw material that spans this entire range because the disparity in initial moisture levels exacerbates the variations in water absorption during hydration with small amount of water, which would, in turn, result in a non-uniform final product. As such, in order to use many prior art methods and apparatuses, the practitioner is limited to using rotating vessels and to batches of raw materials, each of which falls within a small sub-group of initial moisture-content ranges (e.g., those in the 6–8% range, or those in the 10–12% range, etc.).

In the current state of the art, there are also disadvantages associated with the end product itself (e.g., with the dehydrated bean product). For example, even though one goal of dehydrated food products is to allow for rapid water take-up at reconstitution, this goal is only partially met in current dehydrated bean products. As is known in the art, most current methods produce products that are either in the shape of small pellets or in the shape of flakes or in the shape of fine powder. In the case of pellets, because of the way in which the final product is prepared, typically only a small portion of the surface area of each pellet (i.e., typically, the two ends of each pellet) provides areas through which water can easily be absorbed; the remainder of the pellet's outer surface is inefficient in absorbing water. Flakes, on the other hand, due to their method of manufacture, have a harder outer surface and are generally treated with oil on their surface, which is a water repellent, so that water take-up upon reconstitution is actually slower than it may be otherwise. Therefore, in both cases, water absorption rates are not optimal.

Moreover, upon reconstitution, many of the dehydrated products currently available turn into paste-like, or other similar, uniform compositions, where there is generally a lack of texture in the food. This is especially true with methods and apparatuses that produce a granular, rather than a pelletized, or flake-like, dehydrated product. In addition, regardless of the actual shape and form of the final product, there is no simple provision in existing methods and apparatuses for varying (i.e., custom making) the texture of the final product as desired.

Reference is made to U.S. Pat. Nos. 4,676,990; 4,735,816 and 4,871,567 as further examples of the prior art. These references illustrate various bean-making processes, but all have a number of shortcomings. For example, in the '990 patent, a pelletized product is produced by particularized processing steps and related apparatus. In the '816 and '567 patents, a thin, flake-like product is produced by means of yet other particularized processing steps and apparatus. These processes are complicated and the final products are only marginally close to refried beans made to have a pleasant texture with a desired amount of bean particulates.

The features and advantages of the present invention will become more apparent through the following description. It should be understood, however, that the detailed description and specific examples, while indicating particular embodiments of the invention, are given by way of illustration only and various modifications may naturally be performed without deviating from the spirit of the present invention.

DETAILED DESCRIPTION

Figure 1:
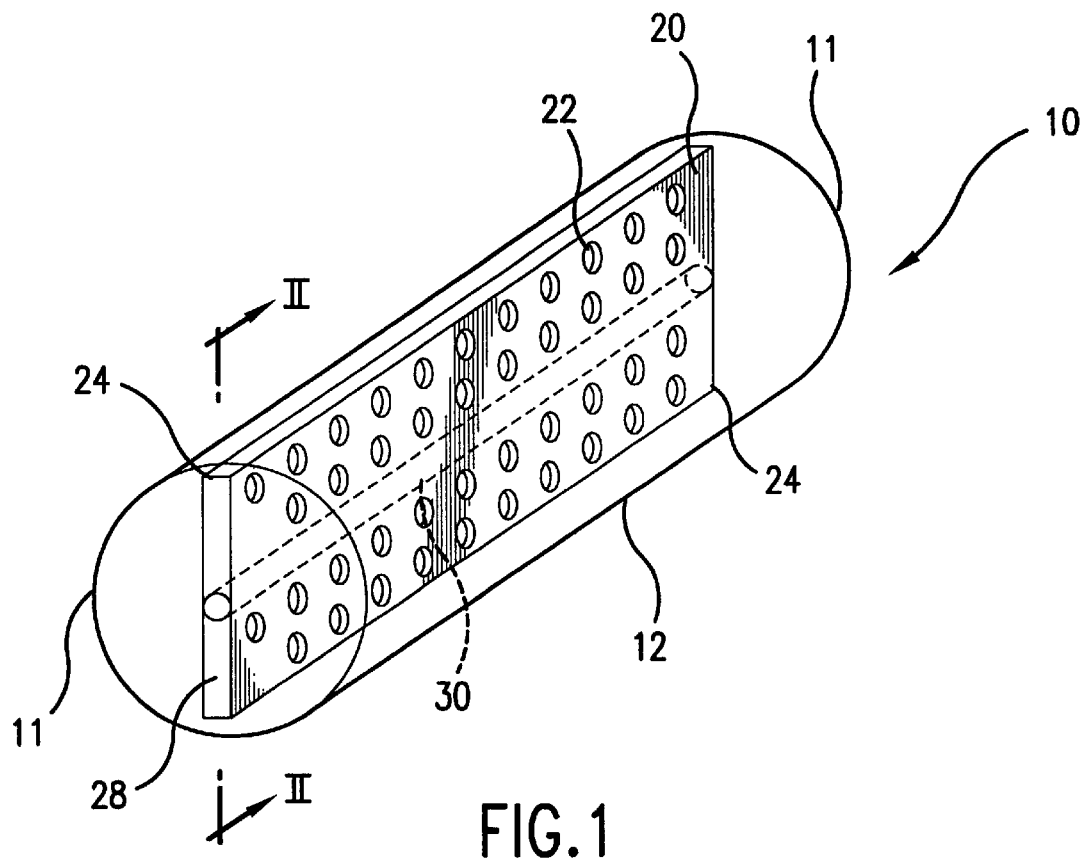
FIG. 1 shows an illustration of a vessel and rotating member of an apparatus that may be used in the practice of an embodiment of the invented method.

An embodiment of the present invention is related to a method or process for producing a reconstitutable, dehydrated food product, which may be practiced by use of apparatus comprising a stationary hydration/cooking vessel, a chopping system, and a forming mechanism. The hydration/cooking vessel is equipped with a perforated internal baffle which rotates continuously to ensure contacting of all beans or other foods with a small and continuous diminishing quantity of water; the baffle holes ensure that fluids within the vessel are exchanged freely between the two chambers of the vessel as defined by the baffle. Once cooked, the beans are transferred to the chopping system, wherein they are urged through a channel, comprising a rotating blade that chops, and a perforated plate that re-sizes, the beans into a texturized composition. The blade speed and the size of the holes in the perforated plate can be changed in order to achieve different textures within the composition. The latter is then treated in a forming mechanism, comprising a shaped conduit, wherein the composition is formed into a flat sheet, which is then treated so as to produce an improved reconstitutable dehydrated bean product.

The stationary hydration/cooling vessel of the present invention has significant processing advantages. First, since the vessel is stationary, it is relatively simple to construct large units which result in substantial economies of scale. Second, by using a horizontal cooking vessel with a perforated internal baffle having a length and width that are substantially the same as the vessel, it is easy to assure that, during processing, all of the beans are gently and continuously contacted with a small, and diminishing quantity of liquid.

Embodiments of the present invention are directed to a method of preparing a reconstitutable, dehydrated food product by means of hydrating and cooking raw beans, so that all of the cooked beans achieve a similar moisture content, chopping the cooked beans into a flat sheet of texturized composition, partially drying the sheet, breaking the sheet up into large chunks, and then completely drying the chunks.

The above-described process, particularly the sequence involving the latter three steps, results in a bean product that absorbs water faster and more uniformly upon reconstitution. Also, after the raw beans have been hydrated, the excess liquid can be removed from the vessel, thus eliminating some flatulent sugars from, and improving the digestibility of, the final bean product. Moreover, salt and other flavoring may be added to a portion of the removed excess water and then added back to the vessel before the beans are cooked. Alternatively, flavoring may be added during the chopping, or other steps, of the above-described process. Finally, depending on the desired texture and chunkiness of the final product, a portion of the cooked whole beans may be removed before the chopping step, and then added to the beans in a subsequent step, or to the final product upon reconstitution.

Figure 4:
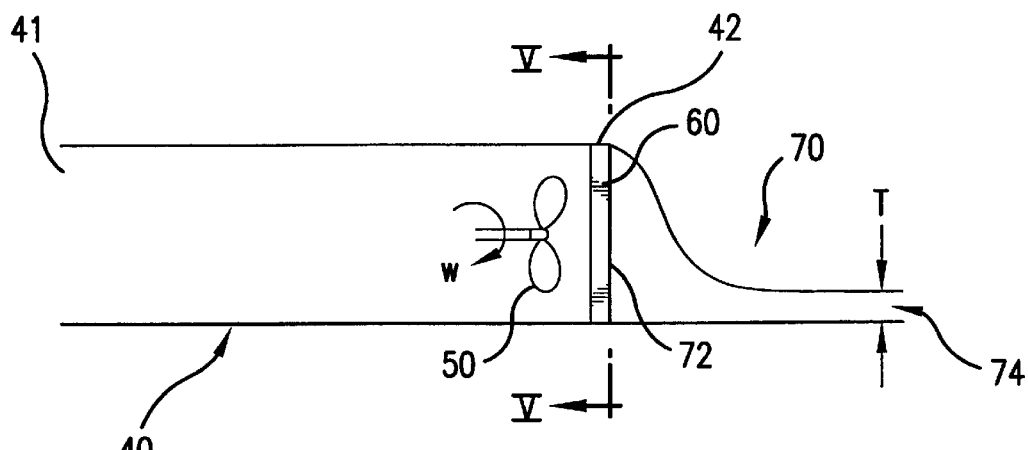
FIG. 4 shows an illustration of a channel and forming conduit of an apparatus that may be used in the practice of an embodiment of the invented method.

FIGS. 1 and 4 show one embodiment of the apparati which may be used to practice the present invention. As shown in these figures, a stationary vessel 10 comprises a vessel shell 12, and a central shaft 30. Although the figures show that the vessel 10 has a substantially circular cross-section, this is done for purposes of demonstration only, and it is intended that the invention encompass other vessel configurations as well.

The vessel 10 is also equipped with a solid-blade baffle 20, which is attached to, and rotates around, shaft 30. In the preferred embodiment, baffle 20 has a length and width that are substantially as long as the length and width, respectively, of the vessel 10. Therefore, in the embodiment of FIGS. 1 and 2, the width of the baffle 20 is substantially commensurate with the diameter of a cross-section of the vessel 10. To ensure proper operation, a clearance of about 1/16 inch is maintained between the inner surface 18 of the shell 12 and an edge 24 of the baffle 20, as well as between an end 28 of the baffle 20 and an end 11 of the vessel 10.

Figure 2:
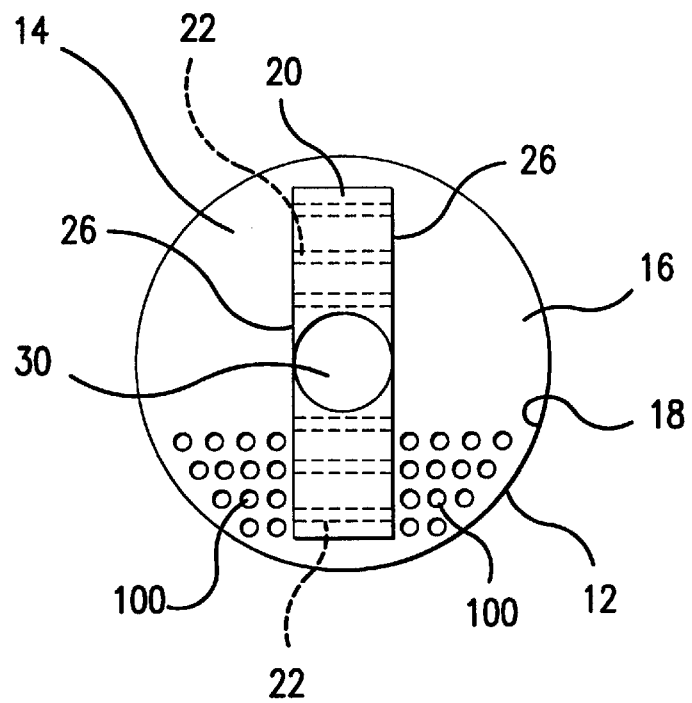
FIG. 2 shows a cross-sectional view of the vessel and rotating member of FIG. 1, taken along line II—II.

As is shown in FIG. 2, at any point in time, the baffle 20 divides the inner space of the vessel 10 into two chambers, 14 and 16, where each chamber is defined substantially by the space between the inner surface 18 of the vessel shell 12, and a wall 26 of the baffle 20. The solid-blade baffle 20 has transverse holes 22 (shown in FIG. 1, and by dashed lines in FIG. 2) which, while large enough to allow fluids within the vessel 10 to travel between the chambers 14 and 16, are small enough to keep the vessel contents 100 separated on each side of the baffle 20.

Figure 3:
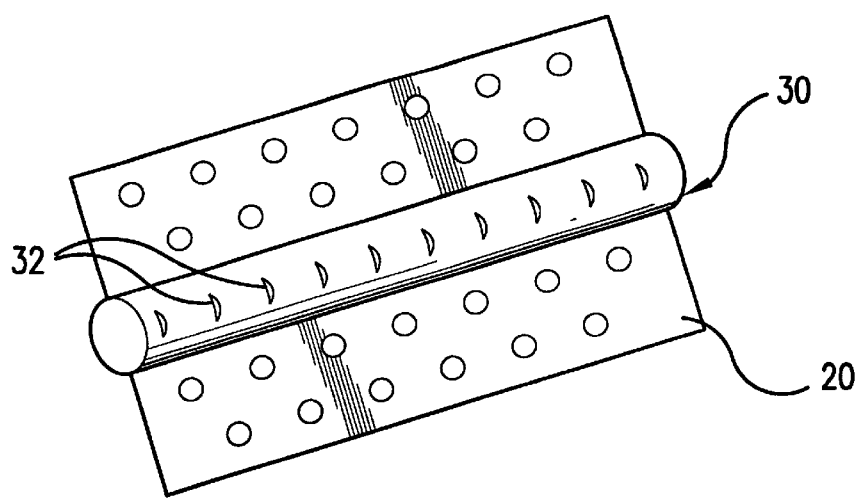
FIG. 3 shows an illustration of a shaft and rotating member of an embodiment of the vessel.

In the preferred embodiment, the vessel 10 is employed both to hydrate raw beans and to cook the hydrated beans. As will be explained in detail below, when used in the latter capacity, the vessel 10 is transformed into a pressure cooker, using steam to cook the beans. To achieve uniform steam injection into the chambers 14 and 16, steam is forced through the shaft 30, and enters each chamber 14, 16 through steam outlets 32 which are arranged along the length of the shaft 30 (FIG. 3). However, steam can also be injected into the vessel through other suitably placed entrances to the vessel.

Figure 5:
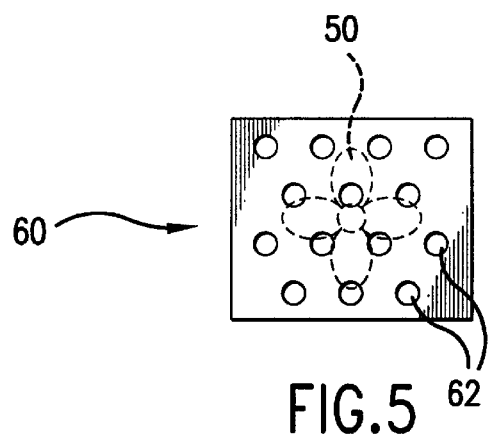
FIG. 5 shows a cross-sectional view of the channel and forming conduit of FIG. 4, taken along line V—V.

FIG. 4 depicts the remaining components of an embodiment of the invention. Channel 40 is an elongated hollow structure which is equipped with a rotating blade 50 and a perforated plate 60 adjacent its distal end 42. The proximal end 41 of the channel is located adjacent the vessel 10 and receives the cooked beans from the vessel 10. Once received, the beans are urged through the channel by a piston or other suitable mechanism, such as a rotating shaft with advancing flights. Therefore, as the blade 50 rotates, it chops cooked beans into pieces, which are then urged through the holes 62 of perforated plate 60 (FIG. 5). It is noted that, although the plate 60 is shown to have a rectangular cross-section, the present invention is not intended to be limited to this configuration; rather, both the plate 60 and the channel 40 may have cross-sections of various geometries. Moreover, the rotating blade 50 and perforated plate 60 may be disposed at other locations along the longitudinal axis of the channel 40.

Figure 6:
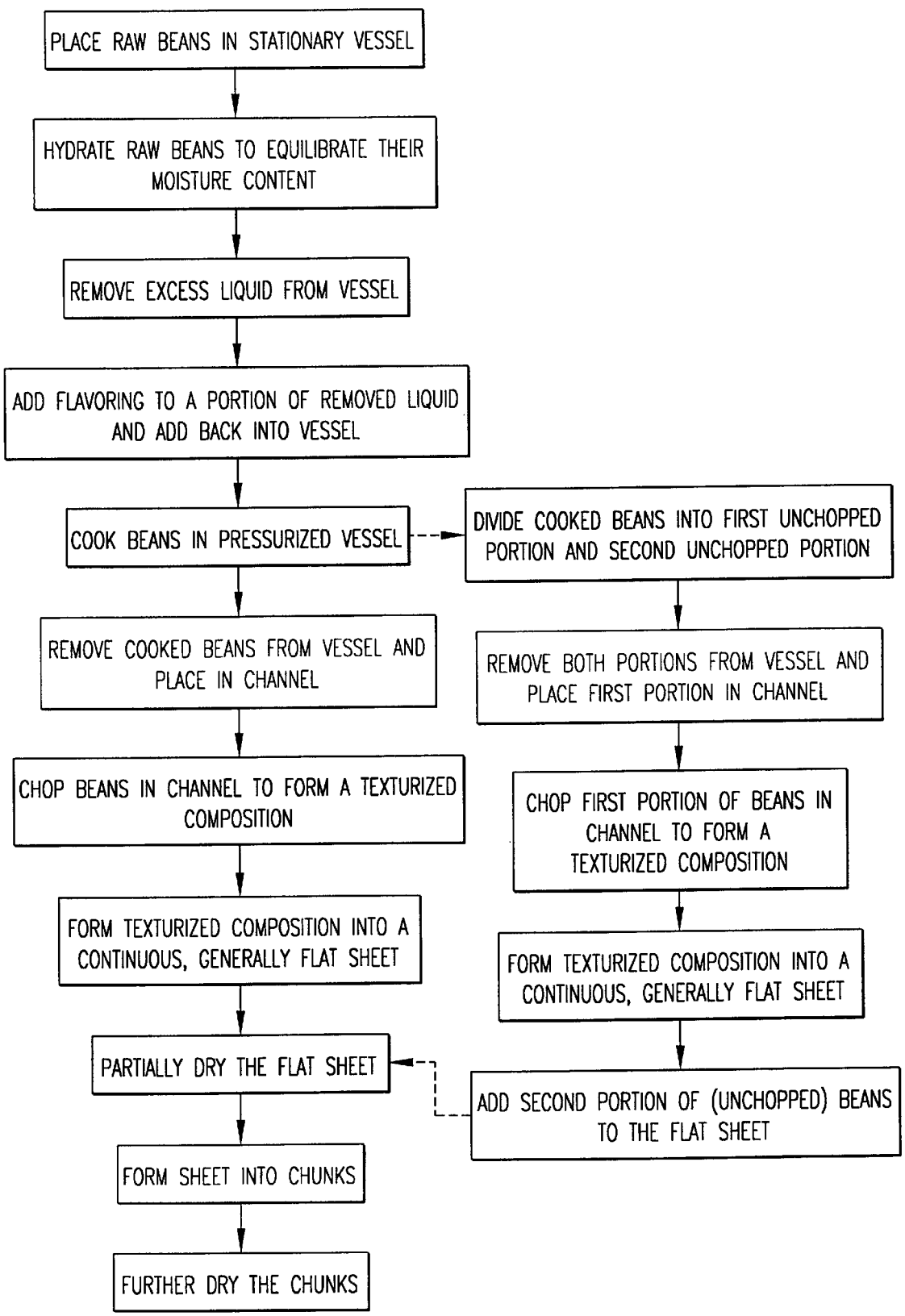
FIG. 6 shows a condensed flow-chart format of non-exhaustive, alternative embodiments of the invented method.

The channel 40 is adjacent to, and in flow communication with, a forming conduit 70, which comprises an inlet 72 and an outlet 74. As is explained in more detail below, chopped beans exit the outlet 74 in a flat sheet of textured composition, where the flat sheet has a generally rectangular cross-section, and the thickness of the sheet is determined by the thickness T of the conduit outlet 74. In a preferred embodiment, T typically lies in the range 1/8–1/4 inch FIG. 6 shows, in condensed flow-chart format, two non-exhaustive, alternative embodiments of the method of the present invention. In practice, raw whole beans are placed into chambers 14 and 16 of stationary vessel 10, on either side of the baffle 20. Water is then added to the vessel 10 in an amount that is at least equal in weight to the weight of the beans in the vessel. Although, in principle, the beans could be hydrated by just allowing them to soak in the water for a period of time, experience has shown that this practice results in non-uniform water absorption by the beans. That is, over time, as the beans on the top of the pile absorb water, the water level in the vessel decreases, which causes non-uniform water absorption throughout the pile of beans.

On the other hand, it is known that raw beans typically have an initial moisture content in the range 6%–14%. However, given their non-uniform hydration procedures, prior-art methods cannot use a batch of raw materials that includes beans and legumes from this entire range because the disparity in initial moisture levels may exacerbate the variations in water absorption during hydration, so that the result would be a highly non-uniform final product. As such, for every batch of raw materials, the prior art is limited to using raw beans that fall within a small range of initial moisture content, e.g., 6–8%, or 12–14%. The present invention, however, is not so limited.

In the preferred embodiment, once water has been added to the raw beans in the vessel 10, the baffle 20 is activated, and the beans are hydrated at atmospheric pressure and a temperature between 150° F. and 185° F. By rotating around the central shaft 30, the baffle 20 continuously brings the beans into contact with water, so that the beans do not generally remain in one place throughout the hydration step. That is, the beans are continuously replaced from the top to the bottom, and vice versa. In addition, the holes 22 of the baffle 20 ensure that water is exchanged between the chambers 14 and 16, so that the hydrating water is not stationary either, and reaches the beans in both chambers. The combination of the rotating baffle 20 and the water exchange between the chambers 14 and 16 allows the moisture level in all of the beans to equilibrate to about the same level. Typically, during the hydration step, the beans absorb between 50% and 80% of the water that they are capable of absorbing.

In the preferred embodiment, the legumes are cooked using direct steam injection. Therefore, there is no need to have any water in the vessel 10 while the beans are being cooked. Thus, once the beans have been properly hydrated, any excess water can be removed from the vessel 10. There is, however, an added advantage to removing excess water, namely, that flatulent sugars are also removed along with the excess water, which results in improved digestibility of the final bean product.

An option, at this point, is to add salt or other flavoring or oil to a portion of the removed water, and then return the combination to the vessel 10. In cases where this is done, a relatively small amount of water is added back to the vessel 10, so that it is generally insufficient to cover all of the beans in both chambers 14, 16. Also, either as a substitute for, or a supplement to, this option, salt and other flavoring may be added at various other steps within the process (e.g., during the chopping step).

Using direct steam injection, the vessel 10 is now pressurized above atmospheric pressure, and the beans are cooked at a temperature greater than 212° F. Specifically, steam is forced through the central shaft 30 and is injected into the vessel 10 and chambers 14 and 16 through the steam outlets 32. During the cooking step, the baffle 20 rotates around the central shaft 30 as it did during the hydration step, thus continuously contacting beans in each chamber 14, 16 with the small amount of water that rests at the bottom of the stationary cooling vessel. At the end of the cooking step, there is little or no water left in the vessel, and the beans are removed and transferred to the channel 40.

Within channel 40, the cooked beans are urged towards the distal end 42 via the piston/rotating shaft. As the beans are urged forward, they are chopped by a rotating blade 50, which rotates at an angular velocity $\omega$. The beans are then pushed through the holes 62 of the perforated plate 60, which is located distal to the rotating blade 50 and re-sizes the chopped beans as they travel past the plate. In this way, a texturized composition is created, wherein the texture, or chunkiness, of the composition (and of the final bean product) is determined by the angular velocity $\omega$ of the blade 50 and the hole sizes of the plate 60. Therefore, the present invention offers the capability of varying the texture of the final bean product to a desired consistency by changing the blade angular velocity $\omega$, the size of the plate holes 62, or both.

The chopped beans are next fed through the forming conduit 70. As shown in FIG. 4, in the preferred embodiment, the inlet 72 of the forming conduit 70 is connected to the distal end 42 of the channel 40. However, this is not required, as long as the conduit 70 and the channel 40 are in flow communication, so that chopped beans exiting the channel from its distal end 42 flow into the forming conduit through its inlet 72. For example, the inlet 72 may comprise a hopper, or other inlet configuration, that is situated within close proximity of, but not necessarily connected to, the channel 40. Regardless, once the chopped beans are in the conduit 70, they are urged towards the conduit outlet 74. The outlet 74 has a rectangular cross-section, with a thickness T, and a width that is considerably larger than T. Therefore, as the texturized composition exits the conduit outlet 74, it is formed into a substantially flat generally continuous elongated sheet, with a rectangular cross-section of thickness T. Typically, T lies within the range of approximately 1/8–1/4 inch.

The flat elongated sheet of texturized composition is next dried from top to bottom, but only partially. It has been found that, by partially drying first, and then breaking up the texturized composition of beans into pieces, chunks of bean product are produced that have rough uneven, porous, thick and undulating edges. Moreover, each chunk has a larger surface area containing these rough edges than do bean products prepared according to prior-art methods. This translates into pieces with a porous surface that takes up and absorbs water much more easily and quickly upon rehydration. That is, this improvement allows for higher absorption rates, as well as a more uniform pattern of water take-up than is available in the prior art.

The partial drying of the sheet of texturized composition is achieved by using conventional drying methods and apparatuses. Once partially dried, the sheet is broken up, or formed, into chunks where each chunk is approximately 0.75 to 1.5 inches in size. These chunks are then further dried down to a final moisture content of about 10%, thus producing a shelf stable bean product of a desired texture, with improved water absorption qualities and enhanced digestibility. Alternatively, the bean sheet can be first completely dried and then broken into smaller pieces.

As shown by the dashed arrows in FIG. 6, an alternative embodiment of the method disclosed herein may include the following steps: After the beans are cooked in the vessel 10, they are divided into a first unchopped portion and a second unchopped portion. The first portion is then taken through the remainder of the process as before, while the second portion is kept separate. That is, the beans in the first portion are chopped in the channel 40, and then formed into a sheet of texturized composition in the forming conduit 70. However, before the sheet is partially dried, the beans from the second portion, which have remained unchopped, are added to the sheet. The entire sheet is then partially dried, broken up into chunks and, dried further. This procedure allows an added measure of control over the texture and composition of the final bean product.

An example is set forth below to further illustrate the present invention:

EXAMPLE 12 liters of hot water were placed in a small (8 inch diameter by 24 inch long) horizontal cylindrical cooking vessel. The water was then further heated to 185° F. by passing steam through the shaft of the central baffle, while slowly rotating the baffle so as to agitate the water.

Approximately 4000 ml of the hot water was drained from the vessel, and 7 lb. of dry pinto beans were then placed in the vessel—one half of these beans being distributed along one side of the baffle, and the remaining half on the other side of the baffle.

The vessel was then maintained at atmospheric pressure, and the baffle was alternately and continuously slowly rotated for one (1) minute each in the clockwise and counterclockwise directions. Steam was added through the baffle shaft to maintain the bean/water mixture temperature between approximately 180° F. and 190° F. The beans immediately started to absorb the hot water, and the rotating baffle served to mix and contact the beans with a continuously diminishing quantity of water. This hydration step was continued for 20 minutes, after which approximately 6700 ml of broth was drained from the now partially-hydrated beans. 75 grams of salt was then dissolved in 600 ml of the drained broth and this salt solution was returned to the cooking vessel.

The hatch to the cooking vessel was now secured and the vessel pressurized with steam and held at a pressure of 10 psig for 40 minutes in order to cook the beans. During this cooking period, the cooking vessel baffle continued to rotate alternatively and slowly for one (1) minute each in the clockwise and counterclockwise directions. In this manner, all the beans were contacted with the remaining and continuously reducing broth volume.

At the end of the cooking step, the vessel was depressurized and the cooked beans with very little remaining liquid broth were discharged into a holding vessel.

These cooked beans were then chopped and texturized by a small electrically driven meat grinder, which had a front plate with ¼ inch holes and knife cutters which rotated against the inner side of the front plate.

The cooked beans were manually fed into the grinder and the textured bean mass collected as it exited through the grinder front plate.

The textured bean mass was then placed in a cylindrical vessel, and was shaped into a sheet approximately ⅛ inch in thickness and 4 inches wide by applying pressure to the vessel so as to force the bean mass through a ⅛ inch by 4 inch slot situated at the base of the vessel.

As the textured bean mass exited the slot, it was continuously deposited on 6-inch by 6-inch perforated metal squares.

These perforated metal squares, supporting the wet bean sheet, were transferred and placed on a conveyor that passes through a convective dryer.

The bean sheet was initially dried for 3 minutes and 45 seconds using 400° F. hot air impinging on the top and bottom of the bean sheet.

The partially-dried beans were then broken into smaller pieces, placed on the perforated metal supporting squares, and finally dried for 4 minutes in the same convective dryer using 350° F. hot air.

After cooling, these dried, textured beans were stored for rapid reconstitution with water, and subsequent use in food items.

It will be apparent to a person of ordinary skill in the art that embodiments of the present invention are not limited in their design or application to specific embodiments disclosed herein. For example, injection of steam into the stationary pressure vessel may be accomplished through ports in the vessel walls. Alternatively, recirculating water, rather than directly-injected steam, may be used to cook the beans.

Further still, while the process steps and apparatus lend themselves to dried legumes, other food-stuffs are also within the scope of this invention. For example, the apparatus can be used to cook foods such as carrots, celery, meats, chicken, fish and the like without the use of excess amounts of water. Thus, the present invention is intended to encompass all of the embodiments disclosed and suggested herein as defined by the claims appended hereto and any equivalents thereof.

What is claimed is:

1. A process for producing a reconstitutable chunky dehydrated bean product, comprising:
   a. hydrating beans in a vessel;
   b. cooking the hydrated beans in said vessel;
   c. chopping the cooked beans under controlled conditions so as to form a composition of a desired texture;
   d. forming the texturized composition into a generally flat, elongated sheet;
   e. drying the sheet of texturized composition; and
   f. forming the sheet into chunks.

2. A process for producing a reconstitutable chunky dehydrated bean product, comprising:
   a. hydrating beans in a vessel,
   b. cooking the hydrated beans in said vessel;
   c. chopping the cooked beans into a composition of a desired texture;
   d. forming the texturized composition into a generally flat, elongated sheet;
   e. drying the sheet of texturized composition; and
   f. forming the sheet into chunks and further drying said chunks.

3. A process for producing a reconstitutable chunky dehydrated bean product, comprising:
   a. hydrating beans in a stationary vessel;
   b. cooking the hydrated beans in said vessel;
   c. chopping the cooked beans into a composition of a desired texture;
   d. forming the texturized composition into a generally flat, elongated sheet;

e. drying the sheet of texturized composition, and f. forming the sheet into chunks and further drying said chunks.

4. The process defined in claim 1, wherein the hydrating step is carried out at atmospheric pressure and a temperature between 150° F. and 180° F.

5. The process defined in claim 4, wherein, at the end of the hydrating step, the beans have a substantially similar moisture content.

6. The process defined in claim 1, wherein, during the hydrating step, the beans absorb between 50% and 80% of the water that they are capable of absorbing.

7. The process defined in claim 1, wherein the beans are hydrated with a liquid, and the amount of liquid used is such that substantially all of the liquid is absorbed by the beans before they are chopped in step c.

8. The process defined in claim 1, wherein the cooking step is accomplished through steam injection so that the vessel is pressurized and the beans are cooked at a temperature greater than 212° F.

9. The process defined in claim 1, wherein a further component selected from the group consisting of flavoring, oil, and mixtures thereof is added to the beans in the vessel.

10. A process for producing a reconstitutable chunky dehydrated bean product, comprising:

a. hydrating beans in a vessel;

b. cooking the hydrated beans in said vessel;

c. chopping and urging the cooked beans through a perforated plate so as to produce a composition of a desired texture;

d. forming the texturized composition into a generally flat, elongated sheet;

e. drying the sheet of texturized composition; and f. forming the sheet into chunks.

11. The process defined in claim 10, wherein flavoring is added to the beans during the chopping step.

12. A process for producing a reconstitutable chunky dehydrated bean product, comprising:

a. hydrating beans in a vessel;

b. cooking the hydrated beans in said vessel;

c. chopping the cooked beans into a composition of a desired texture;

d. forming the texturized composition into a generally flat, elongated sheet;

e. partially drying the sheet of texturized composition;

f. forming the sheet into chunks; and g. completing the drying of the chunks.

13. The process defined in claim 1, wherein the chunks are approximately ⅛ to ¼ inches thick and have rough, porous edges.

14. The process defined in claim 13, wherein the chunks include a portion of bean segments.

15. A process for producing a reconstitutable dehydrated chunky bean product, comprising:

a. hydrating raw beans in a vessel;

b. cooking the hydrated beans in said vessel;

c. dividing the cooked beans into a first unchopped portion and a second unchopped portion;

d. chopping said first portion of the cooked beans to form a composition of a desired texture;

e. forming the texturized composition into a generally flat sheet;

f. adding said second unchopped portion of cooked beans to said flat sheet;

g. partially drying the flat sheet of texturized composition;

h. forming the sheet into chunks; and i. further drying the chunks so as to produce the dehydrated bean product.

16. A process for producing a reconstitutable chunky dehydrated bean product, comprising:

a. hydrating beans in a vessel, b. removing excess water from the vessel after the beans have been hydrated;

c. adding flavoring to a portion of the excess water;

d. returning said portion of excess water back to the vessel;

e. cooking the hydrated beans in said vessel;

f. chopping the cooked beans into a composition of a desired texture;

g. forming the texturized composition into a generally flat, elongated sheet;

h. drying the sheet of texturized composition; and i. forming the sheet into chunks.

17. A process for producing a reconstitutable dehydrated chunky bean product, comprising:

a. hydrating raw beans in a stationary vessel at atmospheric pressure and at a temperature between 150° F. and 185° F., wherein, the beans are contacted with a liquid and are agitated by a perforated baffle rotating around the longitudinal axis of the vessel;

b. removing excess liquid from said vessel;

c. adding flavoring to a portion of the excess liquid;

d. returning said portion of the flavored excess liquid back to the vessel;

e. cooking the hydrated beans in said vessel so that the vessel is pressurized and the beans are cooked at a temperature in excess of 212° F., wherein the beans are contacted and agitated by the perforated baffle rotating around the longitudinal axis of the vessel;

f. cutting the cooked beans by urging them through a hollow elongated structure defining a channel which has a rotating blade and a perforated plate at a distal end thereof, to form a composition of a desired texture;

g. forming the texturized composition into a generally flat, elongated sheet;

h. partially drying the sheet of texturized composition;

i. forming the sheet into chunks; and j. further drying the chunks so as to produce the dehydrated bean product.

18. The process defined in claim 15, further comprising the steps of:

a. removing excess water from the vessel after the beans have been hydrated;

b. adding one or more components selected from the group consisting of salt, flavoring, and oil to a portion of the excess water; and c. returning said portion of excess water back to the vessel prior to initiating the cooking step.

19. A process for producing a reconstitutable dehydrated chunky bean product, comprising:

a. hydrating raw beans in a vessel;

b. cooking the hydrated beans;

c. dividing the cooked beans into a first unchopped portion and a second unchopped portion;

d. chopping said first portion of the cooked beans to form a composition of a desired texture;

e. adding said second unchopped portion of cooked beans to the texturized composition;
f. forming the texturized composition into a generally flat sheet;
g. drying the flat sheet of texturized composition; and
h. forming the sheet into chunks.

20. A process for producing a reconstitutable dehydrated chunky bean product, comprising:
   a. hydrating raw beans in a vessel;
   b. cooking the hydrated beans;
   c. dividing the cooked beans into a first unchopped portion and a second unchopped portion;
   d. chopping said first portion of the cooked beans to form a composition of a desired texture;
   e. forming the texturized composition into a generally flat sheet;
   f. drying the flat sheet of texturized composition;
   g. forming the sheet into chunks; and
   h. adding said second unchopped portion of cooked beans to said chunks.

21. The process defined in claim 20, further comprising:
   a. removing excess water from the vessel after the beans have been hydrated;
   b. adding one or more components selected from the group consisting of salt, flavoring, and oil to a portion of the excess water; and
   c. returning said portion of excess water back to the vessel prior to initiating the cooking step.

22. The process defined in claim 20, wherein one or more components selected from the group consisting of salt, flavoring, and oil are added to the beans prior to the cooking step.

23. The process defined in claim 16, wherein, in step (c), one or more components selected from the group consisting of salt, flavoring, and oil are added to said portion of the excess water.

* * * * *